United States Patent
Yu et al.

(10) Patent No.: US 11,461,089 B2
(45) Date of Patent: Oct. 4, 2022

(54) DATA ANALYSIS METHOD, DEVICE AND SYSTEM

(71) Applicant: Siemens Aktiengesellschaft, Munich (DE)

(72) Inventors: Ming Yu, Wuhan (CN); Zhou Yuan, Wuhan (CN); Yi Liu, Wuhan (CN); Qi Wang, Wuhan (CN); Yue Hua Zhang, Wuhan (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/417,465

(22) PCT Filed: Dec. 28, 2018

(86) PCT No.: PCT/CN2018/124993
§ 371 (c)(1),
(2) Date: Jun. 23, 2021

(87) PCT Pub. No.: WO2020/133250
PCT Pub. Date: Jul. 2, 2020

(65) Prior Publication Data
US 2022/0083325 A1 Mar. 17, 2022

(51) Int. Cl.
*G06F 8/65* (2018.01)
*G06F 16/23* (2019.01)

(52) U.S. Cl.
CPC ............ *G06F 8/65* (2013.01); *G06F 16/2379* (2019.01)

(58) Field of Classification Search
USPC ........................................................ 717/173
See application file for complete search history.

(56) References Cited

U.S. PATENT DOCUMENTS 9,438,648 B2    9/2016  Asenjo et al.
9,843,617 B2 *  12/2017 Maturana ............... G05B 19/18
(Continued)

FOREIGN PATENT DOCUMENTS

CN    107172128 A    9/2017
CN    107172128 A    9/2017
(Continued)

OTHER PUBLICATIONS

Gomes et al.; "A Middleware with Comprehensive Quality of Context Support for the Internet of Things Applications"; Sensors (Basel, Switzerland); 2017 (Year: 2017).*
(Continued)

*Primary Examiner* — Qing Chen
*Assistant Examiner* — Clint Thatcher
(74) *Attorney, Agent, or Firm* — Harness, Dickey & Pierce, P.L.C.

(57) ABSTRACT

A data analysis method, device and system are disclosed. In an embodiment, the method includes performing data analysis on the devices by an application by collecting at least one key performance indicator of the devices, estimating the performance of the application according to the result of the data analysis, generating an application upgrade requirement on the basis of the performance estimation result, and sending the upgrade requirement to an industrial cloud; receiving a context data requirement generated by the industrial cloud based upon of the upgrade requirement, collecting context data from the devices according to the context data requirement, and returning the context data to the industrial cloud; and downloading from the industrial cloud the application updated on the basis of the context data. The data analysis mechanism reduces the development process of custom and special applications by automatically upgrading to adapt to changes in field application conditions.

16 Claims, 4 Drawing Sheets

(56) References Cited

U.S. PATENT DOCUMENTS

| | | | |
|---|---|---|---|
| 9,866,635 B2 * | 1/2018 | Maturana | G06F 9/5072 |
| 10,416,660 B2 * | 9/2019 | Maturana | G05B 23/0227 |
| 2017/0343967 A1 | 11/2017 | Verma | |
| 2018/0054490 A1 * | 2/2018 | Wadhwa | G08G 1/0129 |
| 2018/0150068 A1 | 5/2018 | Wang et al. | |
| 2019/0064787 A1 * | 2/2019 | Maturana | G05B 23/0227 |
| 2020/0004523 A1 * | 1/2020 | Eroshkina | H04L 67/12 |
| 2020/0068759 A1 * | 2/2020 | Cvijetinovic | H05K 13/083 |

FOREIGN PATENT DOCUMENTS

| | | | |
|---|---|---|---|
| CN | 107436582 | A | 12/2017 |
| CN | 107436582 | A | 12/2017 |
| CN | 107483629 | A | 12/2017 |
| CN | 107483629 | A | 12/2017 |
| CN | 108803318 | A | 11/2018 |
| CN | 108804668 | A | 11/2018 |
| CN | 108984550 | A | 12/2018 |
| CN | 108984550 | A | 12/2018 |
| CN | 109032094 | A | 12/2018 |
| CN | 109032094 | A | 12/2018 |

OTHER PUBLICATIONS

International Search Report PCT/ISA/210 for International Application No. PCT/CN2018/124993 dated Sep. 27, 2019.
International Search Report and Written Opinion dated Sep. 27, 2019.

* cited by examiner

DATA ANALYSIS METHOD, DEVICE AND SYSTEM

PRIORITY STATEMENT

This application is the national phase under 35 U.S.C. § 371 of PCT International Application No. PCT/CN2018/124993 which has an International filing date of Dec. 28, 2018, the entire contents of each of which are hereby incorporated herein by reference.

FIELD

The present application generally relates to the technical field of the Industrial Internet of Things, and in particular to a data analysis method, an apparatus and a system.

BACKGROUND

Nowadays, along with the development and application of industrial cloud computing, more and more data needs to be collected from plant fields and sent to the cloud for data analysis in order to improve production efficiency and reduce costs. However, the development and application of industrial cloud requires domain knowledge and the know-how for data analysis. Therefore, it is often necessary to develop special applications (apps) to support customized and specific apps for smart factories.

Based on powerful cloud computing and huge industrial data, the industry has a huge demand for specific and efficient data analysis applications for various industry production scenarios in plant management. How to quickly generate data analysis applications and determine key production factors has become a real problem for every industrial plant.

There is not yet a solution to this problem. All data needs to be sent to a cloud terminal if the relationship among production data is to be discovered in order to improve or support better production. However, this is a great technical challenge due to limitations of network transmission and the quality of network connection.

There are also some partial solutions to the above problem. Traditional cloud-based industrial data analysis mechanisms use specific algorithms to transmit all the expected data that is required. However, specific algorithms rely on domain experts, making it impossible to find better solutions fast and flexibly enough in the big data era.

Another method in the prior art consists of deploying big data analysis applications on the intranet, for example, on local edge devices. Due to the limited computing capacity and data volume of edge devices compared with the cloud, these cannot achieve the expected effect.

SUMMARY

In the first embodiment, the present application provides a data analysis method implemented on an edge device side, wherein the edge device side is connected to at least one device side and wherein the method comprises the following steps: S1, performing, by an application on the edge device side, data analysis for the device side by collecting at least one key performance indicator of the device side, evaluating the performance of the application according to the result of the data analysis, generating an application upgrade requirement based on the performance evaluation result, and sending the upgrade requirement to an industrial cloud; S2, receiving a context data requirement generated by the industrial cloud based on the upgrade requirement, collecting context data from the device side according to the context data requirement, and returning the context data to the industrial cloud; S3, downloading, from the industrial cloud, the application updated by the industrial cloud based on the context data.

In an embodiment of the method, step S1 further comprises the following steps: S11, performing, by the application on the edge device side, a data analysis for the device side by collecting at least one key performance indicator of the device side, generating a semantic model of the device side in consideration of the context, and determining, based on the semantic model, whether the result of the data analysis corresponds to a fault reported by the application; S12, when the result of the data analysis does not correspond to a fault reported by the application, determining that the performance of the application needs to be upgraded, generating an application upgrade requirement, and sending the upgrade requirement to the industrial cloud.

In an embodiment of the method, the context comprises a relationship between a device and its related device as well as parameters of the devices.

In an embodiment of the method, step S12 further comprises the following step: when the result of the data analysis does not correspond to the fault reported by the application, determining that the performance of the application needs to be upgraded, then classifying a plurality of key performance indicators related to the device side, and generating an application upgrade requirement based on the classification, wherein the classification involves a first key performance indicator directly related to the device side and an nth key performance indicator directly related to an nth-layer device connected to the device side, wherein n is a natural number, and n≥1; performing queries, layer by layer, starting from a first-layer device connected to the device side based on the classification for a plurality of key performance indicators corresponding to the device side until at least one relevant key performance indicator corresponding to the fault reported by the application is found; then generating an application upgrade requirement based on the relevant key performance indicator, and sending the upgrade requirement to the industrial cloud.

In an embodiment of the method, the data analysis method implemented on an edge device side further comprises the following step after step S2: generating a rule based on the fault reported by the application and the relevant key performance indicator, and storing the rule in a database so as to call the rule from the database to perform a data analysis when the application reports a fault again.

In the second embodiment, the present application provides a data analysis method implemented on an industrial cloud, comprising the following steps: A1, receiving an application upgrade requirement generated according to a performance evaluation result obtained after an edge device side performs a performance evaluation of an application based on a key performance indicator; A2, generating a context data requirement based on the upgrade requirement, and sending the context data requirement to the edge device side; A3, receiving context data collected by the edge device from a device side according to the context data requirement, and updating the application based on the context data so that the updated application is provided to the edge device side for downloading.

In one aspect of the embodiment, the context comprises a relationship between a device and its related device as well as parameters of the devices.

In one aspect of the embodiment, the data analysis method implemented on an edge device side further comprises the following step after step A2: generating a rule based on the fault reported by the application and the relevant key performance indicator, and storing the rule in a database, so as to call the rule from the database to perform data analysis when the application reports a fault again.

In the third embodiment, the present application provides a data analysis apparatus implemented on an edge device side, wherein the edge device side is connected to at least one device side and wherein the apparatus comprises: a performance evaluator, which evaluates the performance of an application according to the result of a data analysis of a device side performed by the application based on at least one key performance indicator of the device side, generates an application upgrade requirement based on the performance evaluation result, and sends the upgrade requirement to an industrial cloud, wherein the application on the edge device side performs a data analysis for the device side by collecting at least one key performance indicator of the device side; a context filter, which receives a context data requirement generated by the industrial cloud based on the upgrade requirement, collects context data from the device side according to the context data requirement, and returns the context data to the industrial cloud; a first APP container, which downloads, from the industrial cloud, the application updated by the industrial cloud based on the context data.

In one aspect of the embodiment, the apparatus further comprises: a context model establishment module, which generates a semantic model of the device side in consideration of the context, wherein the performance evaluator determines whether the result of the data analysis corresponds to the fault reported by the application based on the semantic model, and when the result of the data analysis does not correspond to the fault reported by the application, determines that the performance of the application needs to be upgraded, generates an application upgrade requirement, and sends the upgrade requirement to the industrial cloud.

In one aspect of the embodiment, the context comprises a relationship between a device and its related device as well as parameters of the devices.

In one aspect of the embodiment, the apparatus further comprises: a context model classifier, which, when the result of the data analysis does not correspond to the fault reported by the application, determines that the performance of the application needs to be upgraded, then classifies a plurality of key performance indicators related to the device side, and generates an application upgrade requirement based on the classification, wherein the classification involves a first key performance indicator directly related to the device side and an nth key performance indicator directly related to an nth-layer device connected to the device side, wherein n is a natural number, and n≥1, wherein, starting from a first-layer device connected to the device side, the performance evaluator performs queries, based on the classification, layer by layer, for a plurality of key performance indicators corresponding to the device side until at least one relevant key performance indicator corresponding to the fault reported by the application is found, then generates an application upgrade requirement based on the relevant key performance indicator, and sends the upgrade requirement to the industrial cloud.

In one aspect of the embodiment, the apparatus further comprises a rule generator, which generates a rule based on the fault reported by the application and the relevant key performance indicator, and stores the rule in a database so as to call the rule from the database to perform data analysis when the application reports a fault again.

In the fourth embodiment, the present application provides a data analysis apparatus implemented on an industrial cloud, comprising: an application updater, which receives an application upgrade requirement generated according to a performance evaluation result obtained after an edge device side performs a performance evaluation of an application based on a key performance indicator, generates a context data requirement based on the upgrade requirement, and sends the context data requirement to the edge device side, and then receives context data collected by the edge device from a device side according to the context data requirement, and updates the application based on the context data; a second APP container, which provides the updated application to the edge device side for downloading.

In one aspect of the embodiment, the context further comprises a relationship between a device and its related device as well as parameters of the devices.

In one aspect of the embodiment, the apparatus further comprises a rule generating apparatus, which generates a rule based on the fault reported by the application and the relevant key performance indicator, and stores the rule in a database so as to call the rule from the database to perform data analysis when the application reports a fault again.

In the fifth embodiment, the present application provides a data analysis system implemented on an edge device side, comprising: a processor and a memory coupled to the processor, wherein the memory is provided with an instruction stored in it, which, when executed by the processor, enables an electronic device to perform actions, wherein the actions comprise: S1, performing, by an application on the edge device side, a data analysis for the device side by collecting at least one key performance indicator of the device side, evaluating the performance of the application according to the result of the data analysis, generating an application upgrade requirement based on the performance evaluation result, and sending the upgrade requirement to an industrial cloud; S2, receiving a context data requirement generated by the industrial cloud based on the upgrade requirement, collecting context data from the device side according to the context data requirement, and returning the context data to the industrial cloud; S3, downloading, from the industrial cloud, the application updated by the industrial cloud based on the context data.

In one aspect of the embodiment, action S1 further comprises: S11, performing, by the application in the edge device side, a data analysis for the device side by collecting at least one key performance indicator of the device side, generating a semantic model of the device side in consideration of the context, and determining, based on the semantic model, whether the result of the data analysis corresponds to the fault reported by the application; S12, when the result of the data analysis does not correspond to the fault reported by the application, determining that the performance of the application needs to be upgraded, generating an application upgrade requirement, and sending the upgrade requirement to the industrial cloud.

In one aspect of the embodiment, the context comprises a relationship between a device and its related device as well as parameters of the devices.

In one aspect of the embodiment, action S12 further comprises: when the result of the data analysis does not correspond to the fault reported by the application, determining that the performance of the application needs to be upgraded, then classifying a plurality of key performance indicators related to the device side, and generating an application upgrade requirement based on the classification, wherein the classification involves a first key performance indicator directly related to the device side and an nth key performance indicator directly related to an nth-layer device connected to the device side, wherein n is a natural number, and n≥1; starting from a first-layer device connected to the device side, performing queries, layer by layer and based on the classification, for a plurality of key performance indicators corresponding to the device side until at least one relevant key performance indicator corresponding to the fault reported by the application is found, and then generating an application upgrade requirement based on the relevant key performance indicator, and sending the upgrade requirement to the industrial cloud.

In one aspect of the embodiment, the data analysis method implemented on an edge device side further comprises the following after action S2: generating a rule based on the fault reported by the application and the relevant key performance indicator, and storing the rule in a database so as to call the rule from the database to perform data analysis when the application reports a fault again.

In the sixth embodiment, the present application provides a data analysis system implemented on an industrial cloud, comprising: a processor and a memory coupled to the processor, wherein the memory is provided with an instruction stored in it, which, when executed by the processor, enables an electronic device to perform actions, wherein the actions comprise: A1, receiving an application upgrade requirement generated according to a performance evaluation result obtained after an edge device side performs performance evaluation on an application based on a key performance indicator; A2, generating a context data requirement based on the upgrade requirement, and sending the context data requirement to the edge device side; A3, receiving context data collected by the edge device side from a device side according to the context data requirement, and updating the application based on the context data so that the updated application is provided to the edge device side for downloading.

In one aspect of the embodiment, the context comprises a relationship between a device and its related device as well as parameters of the devices.

In one aspect of the embodiment, the data analysis method implemented on an edge device side further comprises the following after action A2: generating a rule based on the fault reported by the application and the relevant key performance indicator, and storing the rule in a database so as to call the rule from the database to perform data analysis when the application reports a fault again.

In one aspect of the embodiment, the data analysis mechanism provided by the present application simplifies the development process of customized and specific applications, which upgrade automatically to adapt to field operation condition changes.

Embodiments of the present application involve the industrial cloud and the field. The field involves a device side and an edge device side, wherein large and complex devices for generating applications are implemented on the industrial cloud, while small and simple applications are executed on the edge device side, which makes full use of the computing power of both computing platforms. Embodiments of the present application can easily integrate the domain conditions into a model by use of a context establishment module and can ensure that all data analysis algorithms are designed taking account of the real production environment.

DETAILED DESCRIPTION OF EXAMPLE EMBODIMENTS

The particular embodiments of the present application are described below with reference to the drawings.

On a typical Industrial Internet of Things, there are often three layers, namely, the production line equipment, the edge devices, and the industrial cloud. The industrial cloud has a powerful computing function and computing capacity, but the algorithms involved in data analysis often need to combine domain knowledge and real-time on-site production line equipment data. Transmission of the required domain knowledge and data to the cloud in real time across the three layers will not be fast or accurate enough. However, if data analysis is performed at the device layer, the computing resources are not enough to do all the analysis. Therefore, the present application uses the rich resources of the industrial cloud and optimizes resource utilization. Specific data analysis is performed on the edge device side, while edge devices use the real-time data transmission of the production line equipment to describe the field. A field model is then established and uploaded to the industrial cloud to help the industrial cloud in parameter optimization. The present application combines the edge device side and the industrial cloud for data analysis, and uses the dialog between the edge device side and the industrial cloud to assess the effect of the data analysis.

Therefore, the present application provides a data analysis mechanism, which is implemented on both the edge device side and the industrial cloud. Specifically, the function of performance evaluation of applications is executed on the edge device side, the industrial cloud generates context data requirements based on the performance evaluation results, the edge device side is responsible for collecting context data from the connected production line devices, and then the industrial cloud updates the applications based on the context data for downloading by the edge device side.

Figure 1:
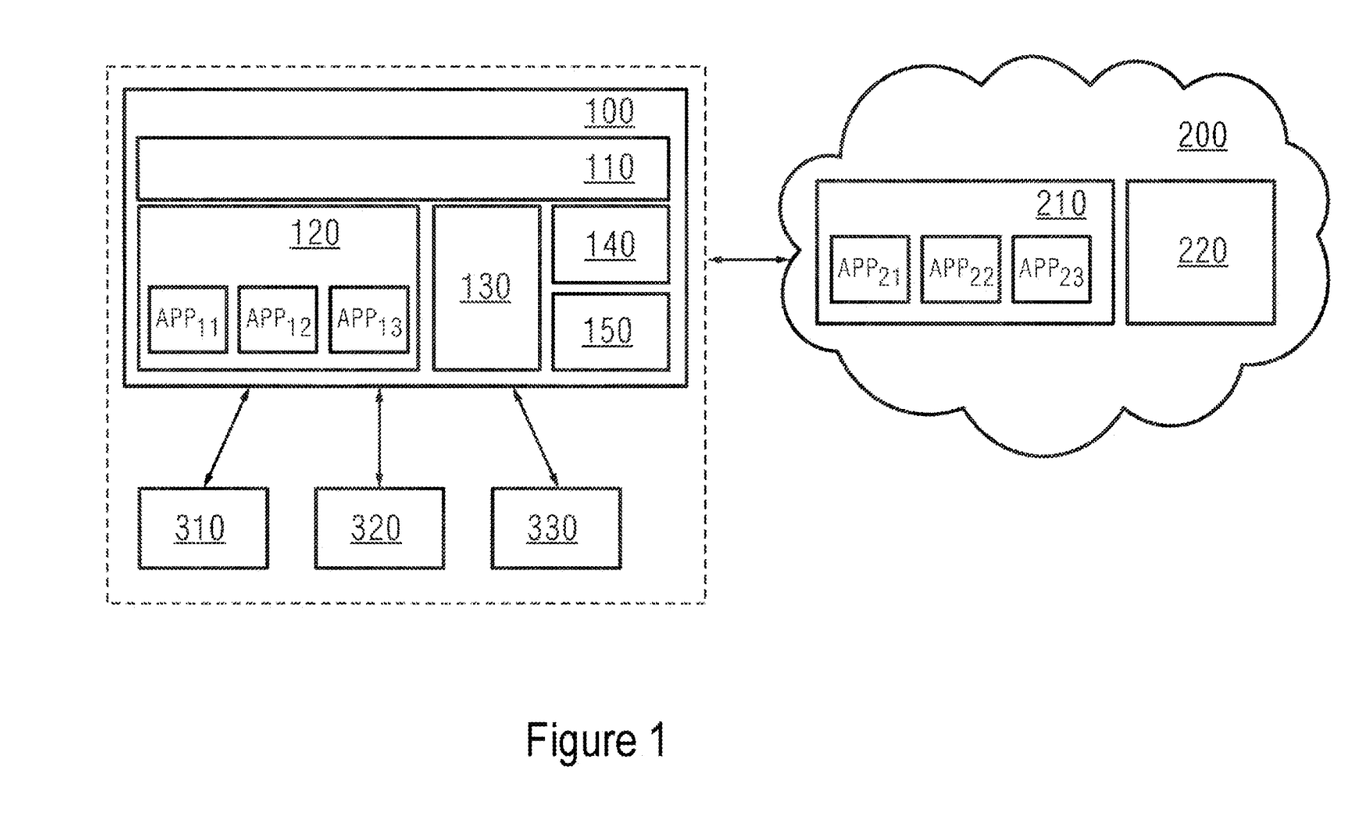
FIG. 1 is a system architecture diagram of the data analysis mechanism according to a particular embodiment of the present application.

As shown in FIG. 1, the data analysis apparatus provided by the present application comprises a cloud platform and a local network, wherein the cloud platform mainly refers to an industrial cloud 200, the local network further comprises an edge device side 100 and a plurality of production line devices connected to the edge device side 100, and the plurality of production line devices include a first device 310, a second device 320, and a third device 330. Specifically, the edge device side 100 is provided with a context filter 110, a first APP container 120, a performance evaluator 130, a context model classifier 140, and a context model establishment module 150. The industrial cloud 200 is provided with a second APP container 210 and an application updater 220. It should be noted that the so-called device side here is not a specific device, but may be any specific device on the production line, and the term is used in distinction from the industrial cloud and the edge device side.

In the first embodiment, the present application provides a data analysis method implemented on an edge device side, specifically implemented on the edge device side 100, and the method comprises the following steps:

Firstly step S1 is performed, wherein an application in the first APP container 120 on the edge device side 100 performs data analysis for the device side by collecting at least one key performance indicator of the device side, and the first APP container 120 sends the key performance indicator of the application to the performance evaluator 130, and the performance evaluator 130 receives at least one key performance indicator of the application based on the current requirement, evaluates the performance of the application according to the result of the data analysis, generates an application upgrade requirement based on the performance assessment result, and sends the upgrade requirement to the application updater 220 on the industrial cloud 200.

Specifically, the first APP container 120 is provided with a plurality of first applications $APP_{11}$, $APP_{12}$, and $APP_{13}$. For example, when the application to be installed in the first APP container 120 is the first application $APP_{11}$, the first APP container 120 will send a key performance indicator, or KPI, of the first application $APP_{11}$ to the performance evaluator 130 for performance evaluation. The data analysis performed by an application on the edge device side 100 is intended to identify and analyze a fault on the device side.

Figure 2:
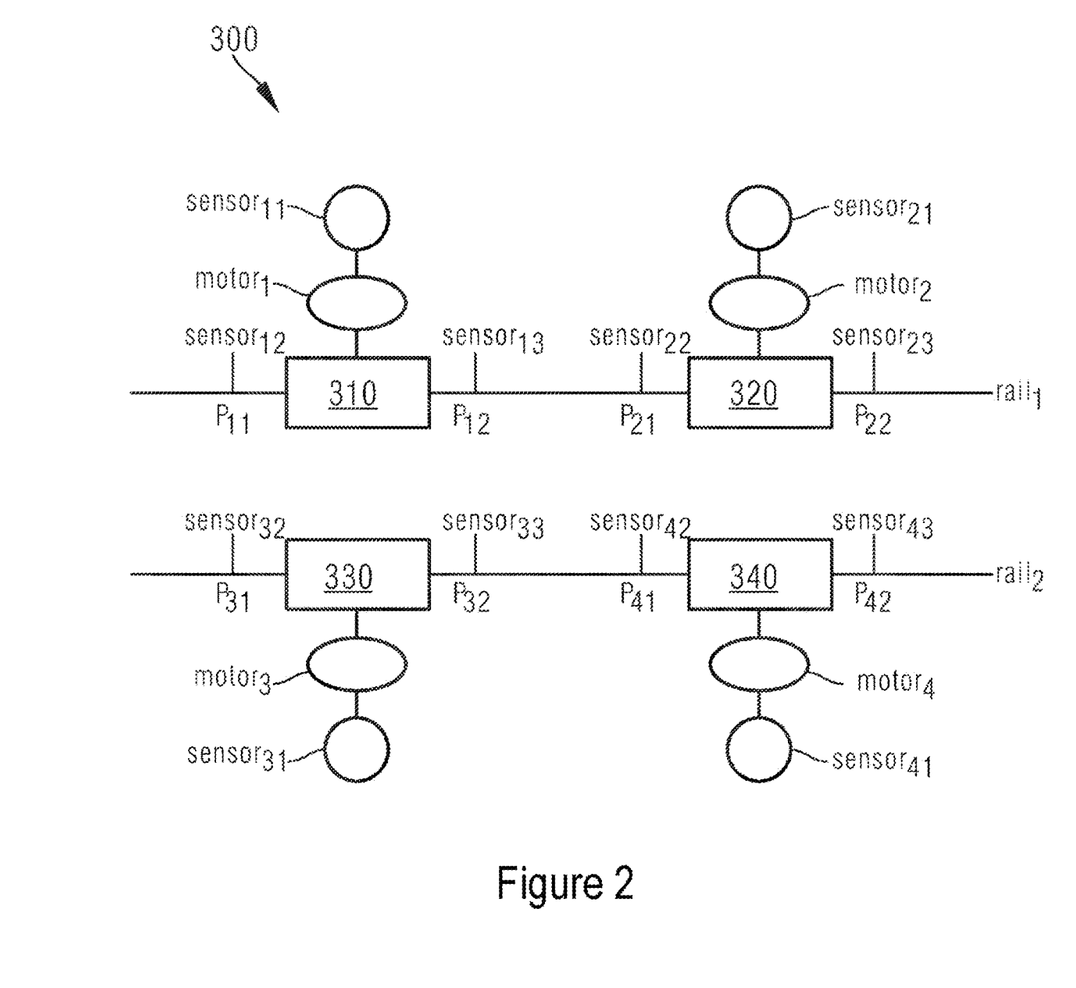
FIG. 2 is a system architecture diagram of the friction wheel fault analysis of an automobile production line according to a particular embodiment of the present application.

FIG. 2 shows the fault analysis of friction wheels on an automobile production line to which the data analysis mechanism of the present application is applied. As shown in FIG. 2, an automobile production line 300 usually has two rails, namely a first rail $rail_1$ and a second rail $rail_2$. The four friction wheels of an automobile are placed on the first rail $rail_1$ and the second rail $rail_2$ in a direction parallel to the rails. Specifically, a first friction wheel 310 is connected to a first motor $motor_1$, and the first motor $motor_1$ is connected to a first vibration sensor $sensor_{11}$. A second position sensor $sensor_{12}$ and a third position sensor $sensor_{13}$ are respectively placed on the two sides of the first friction wheel 310. Specifically, the second position sensor $sensor_{12}$ and the third position sensor $sensor_{13}$ are used to determine that the first friction wheel 310 is positioned at a point between a first position $P_{11}$ and a second position $P_{12}$ on the first rail $rail_1$, the first motor $motor_1$ is used to provide power to the first friction wheel 310, and the first vibration sensor $sensor_{11}$ is used to test the vibration coefficient of the first friction wheel 310. When the vibration coefficient of the first friction wheel 310 exceeds a predetermined threshold, it will be preliminarily decided that the first friction wheel 310 is faulty.

On the first rail $rail_1$, a second friction wheel 320 is placed beside the first friction wheel 310. The vibration of the two friction wheels will affect each other since the first friction wheel 310 and the second friction wheel 320 are placed on the same rail. Specifically, the second friction wheel 320 is connected to a second motor $motor_2$, and the second motor $motor_2$ is connected to a first vibration sensor $sensor_{21}$. A second position sensor $sensor_{22}$ and a third position sensor $sensor_{23}$ are respectively placed on the two sides of the second friction wheel 320. Specifically, the second position sensor $sensor_{22}$ and the third position sensor $sensor_{23}$ are used to determine that the second friction wheel 320 is positioned at a point between a first position $P_{21}$ and a second position $P_{22}$ on the first rail $rail_1$, the second motor $motor_2$ is used to provide power to the second friction wheel 320, and the first vibration sensor $sensor_{21}$ is used to test the vibration coefficient of the second friction wheel 320. When the vibration coefficient of the second friction wheel 320 exceeds a predetermined threshold, it will be preliminarily decided that the second friction wheel 320 is faulty.

The first rail $rail_1$ and the second rail $rail_2$ are parallel to each other. A third friction wheel 330 is placed on the second rail $rail_2$, and the first friction wheel 310 is opposite to the third friction wheel 330. Specifically, the third friction wheel 330 is connected to a third motor $motor_3$, and the third motor $motor_3$ is connected to a first vibration sensor $sensor_{31}$. A second position sensor $sensor_{32}$ and a third position sensor $sensor_{33}$ are respectively placed on the two sides of the third friction wheel 330. Specifically, the second position sensor $sensor_{32}$ and the third position sensor $sensor_{33}$ are used to determine that the third friction wheel 330 is positioned at a point between a first position $P_{31}$ and a second position $P_{32}$ on the second rail $rail_2$, the third motor $motor_3$ is used to provide power to the third friction wheel 330, and the first vibration sensor $sensor_{31}$ is used to test the vibration coefficient of the third friction wheel 330. When the vibration coefficient of the third friction wheel 330 exceeds a predetermined threshold, it will be preliminarily decided that the third friction wheel 330 is faulty.

On the second rail $rail_2$, a fourth friction wheel 340 is placed beside the third friction wheel 330. The vibration of the two friction wheels will affect each other since the third friction wheel 330 and the fourth friction wheel 340 are placed on the same rail. Specifically, the fourth friction wheel 340 is connected to a fourth motor $motor_4$, and the fourth motor $motor_4$ is connected to a first vibration sensor $sensor_{41}$. A second position sensor $sensor_{42}$ and a third position sensor $sensor_{43}$ are respectively placed on the two sides of the fourth friction wheel 340. Specifically, the second position sensor $sensor_{42}$ and the third position sensor $sensor_{43}$ are used to determine that the fourth friction wheel 340 is positioned at a point between a first position $P_{41}$ and a second position $P_{42}$ on the second rail $rail_2$, the fourth motor $motor_4$ is used to provide power to the fourth friction wheel 340, and the first vibration sensor $sensor_{41}$ is used to test the vibration coefficient of the fourth friction wheel 340. When the vibration coefficient of the fourth friction wheel 340 exceeds a predetermined threshold, it will be preliminarily decided that the fourth friction wheel 340 is faulty.

It is assumed that in this embodiment, a first application $APP_{11}$ in the first APP container 120 on the edge device side 100 performs data analysis for a device side by collecting at least one key performance indicator of the device side, and the first APP container 120 sends the key performance indicator, or KPI, of the application to the performance evaluator 130. The performance evaluator 130 receives at least one key performance indicator of the application based on the current requirement, evaluates the performance of the application according to the result of the data analysis, generates an application upgrade requirement based on the performance assessment result, and sends the upgrade requirement to the application updater 220 on the industrial cloud 200. The second step is performed based on the first step. Strong association rules between the lifecycle of the equipment and its parameters are generated, and all the strong association rules are greater than the minimum values. The first and the second steps are iterated until all the context data is traversed.

Specifically, the big data association rule algorithm analysis on motor lifecycle prediction of this embodiment involves two parts. In the first step, it is necessary to search the context data set of the context filter 110 for an item set of all the frequencies, wherein the frequency of context data is greater than a predefined minimum microscale (algorithm analysis on motor lifecycle prediction).

Specifically, the prerequisites are defined as follows:

$C_1$ is the frequency of vibrations greater than 1 mm/s in one hour;

$C_2$ means a plate moving along the driving segment when the position signal is true, wherein the plate prevents an automobile, and the plate can slide along the first rail $rail_1$ and the second rail $rail_2$.

In one embodiment, a vibration coefficient is used at the starting point. The lifecycle of the motor and its vibration coefficient are related, wherein the higher the frequency of $C_1$, the lower the motor life, and the easier for a fault to occur, as shown in the table below:

TABLE 0001

| $C_1$ | Motor life |
|---|---|
| 10 | 10 years |
| 100 | 5 years |
| 200 | 2 years |

If the position data is added, the prediction information will be as follows:

TABLE 0002

| $C_1$ & $C_2$ | Motor life |
|---|---|
| 10 | 7 years |
| 100 | 3 years |
| 200 | 1 year |

Assuming that in this embodiment it is necessary to evaluate the lifecycle management of the first motor $motor_1$, the key performance indicators of the first application $APP_{11}$ are defined as:

$MCmotor_1$ is the maintenance cost of the first motor $motor_1$;

$MDTmotor_1$ is the major down time of the first motor $motor_1$.

In one embodiment, the key performance indicator of the motor $Pmotor_1 = MCmotor_1 \times MDTmotor_1$. Specifically, $Pmotor_1$ being greater than a target value means the performance of the first application $APP_{11}$ is lower than expected, and then the position information is added to the context data of the first motor $motor_1$. Based on the new context data, if $Pmotor_1$ is lower than the target value, as the context data is input into the application updater 220 of the industrial cloud 200 and the computing ends, the relevant algorithm returns the new context data. In order to avoid local optimization of the context data, the position information of the first motor $motor_1$ can be used as the starting point of the iterative computing. After several times of computing the key performance indicator, it is best to set the most suitable context data set for the first application $APP_{11}$ for the lifecycle management of the first motor $motor_1$.

Assuming that in this embodiment the vibration coefficient $V_1$ measured by the first vibration sensor $sensor_{11}$ used to test the first friction wheel 310 exceeds a predetermined threshold, the first application $APP_{11}$ in the first APP container 120 on the edge device side 100 will decide that the first friction wheel 310 is faulty, and the first application $APP_{11}$ will report a fault of the first friction wheel 310. Further, step S1 further comprises a sub-step S11 and a sub-step S12.

In sub-step S11, the application $APP_{11}$ in the first APP container 120 on the edge device side 100 performs a data analysis for the first friction wheel 310 by collecting the vibration coefficient $V_1$ of the first friction wheel 310, generates a semantic model of the first friction wheel 310 in consideration of the context, and determines, based on the semantic model, whether the result of the data analysis corresponds to the fault reported by the first application $APP_{11}$. Although the vibration coefficient is data from the first friction wheel itself, the first vibration sensor $sensor_{11}$ measures a peak value of vibration coefficient $V_1$ in a short time, and it is difficult for the performance evaluator 130 to interpret the data, because it is difficult to decide whether the first friction wheel 310 is working normally or is faulty only based on its friction coefficient $V_1$. When the vibration coefficient $V_1$ measured by the first vibration sensor $sensor_{11}$ exceeds the predetermined threshold, it may be that the first friction wheel 310 itself is faulty, or the second friction wheel 320 adjacent to the first friction wheel 310 or the opposite third friction wheel 330 is faulty, or possibly that the fourth friction wheel 340, not adjacent or opposite to the first friction wheel 310 but on the same automobile, is faulty, or even because of the effect on the first vibration sensor $sensor_{11}$ following an accidental knock by personnel on the production line on the first rail $rail_1$ or even the second rail $rail_2$, or because of the impacts of some control operations on the friction wheels during the production process.

The context model classifier 140 is used to construct and classify context data, for example, to establish a relationship between data mapping and enquiry in a hierarchy method. In an entity, its parameter data is at the first level of the hierarchy, and another entity that has a direct relationship with the entity is at the second level so that an entire context-based model can be built iteratively. The context model establishment module 150 is used to collect context information to establish a context semantic model to build plant field data and operation environment. Specifically, the context comprises a relationship between a device and a related device and a parameter of the device.

Figure 3:
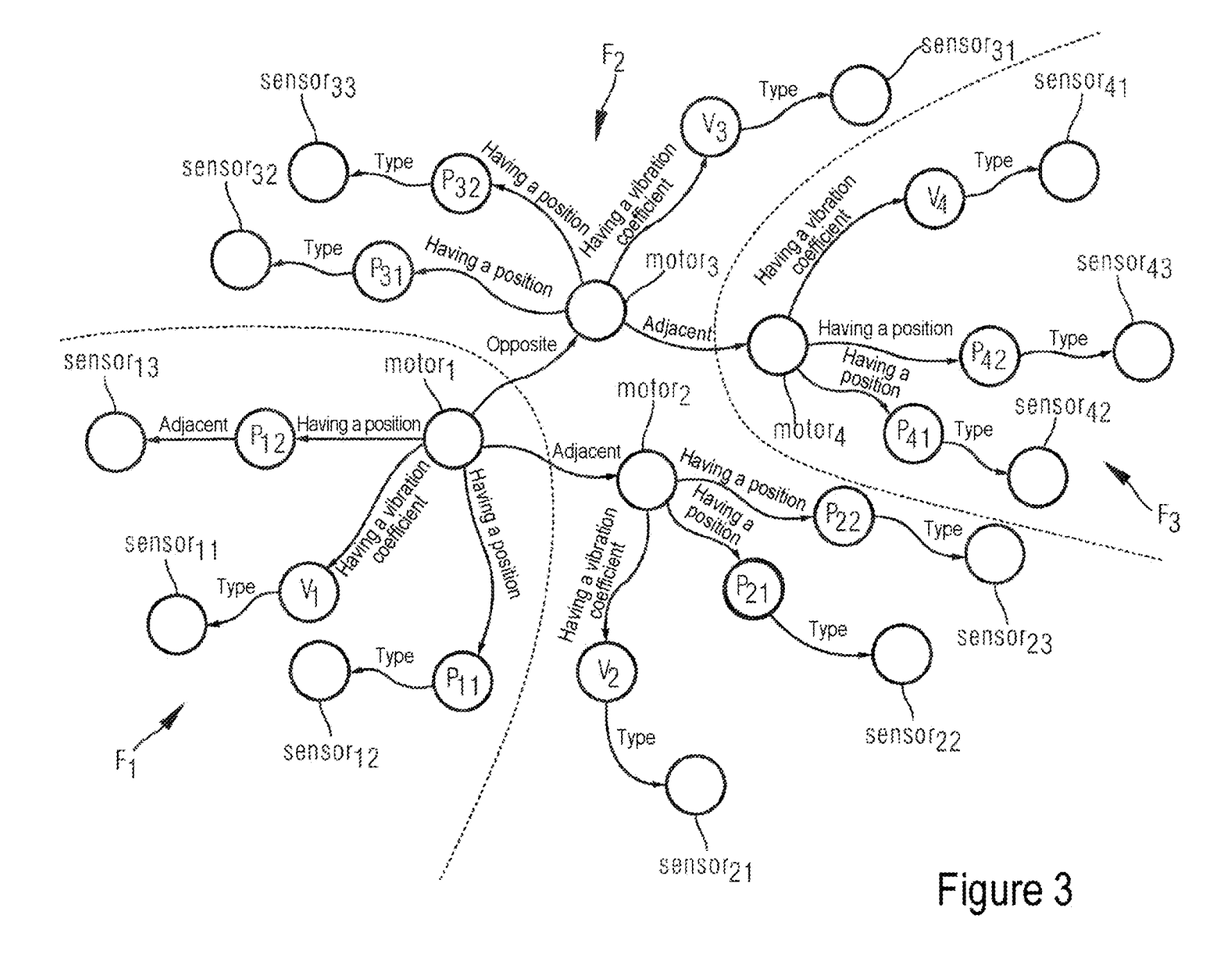
FIG. 3 is a schematic diagram of a semantic model of an automobile production line generated based on the context according to a particular embodiment of the present application.

The semantic model shown in FIG. 3 is a semantic model of a friction wheel on an automobile production line shown in FIG. 2 generated by the context model classifier 140 based on context data, which has the following entities: the first motor $motor_1$ connected to the first friction wheel 310, the first motor $motor_2$ connected to the first friction wheel 320, and the third motor $motor_3$ connected to the third friction wheel 330. The first friction wheel 310 has a first position $P_{11}$ and a second position $P_{12}$. The first position $P_{11}$ has a second position sensor $sensor_{12}$ of the sensor type, and the second position $P_{12}$ has a third position sensor $sensor_{13}$ of the sensor type. The first friction wheel 310 to which the first motor $motor_1$ is connected also has a vibration coefficient $V_1$, wherein the vibration coefficient $V_1$ has a first sensor $sensor_{11}$ of the sensor type.

Further, the first friction wheel 310 is adjacent to the second friction wheel 320, and the first friction wheel 310 is opposite to the third friction wheel. Specifically, the second friction wheel 320 has a first position $P_{21}$ and a second position $P_{22}$. The first position $P_{21}$ has a second position sensor $sensor_{22}$ of the sensor type, and the second position $P_{22}$ has a third position sensor $sensor_{23}$ of the sensor type. The second friction wheel 320 to which the second motor $motor_2$ is connected also has a vibration coefficient $V_2$, wherein the vibration coefficient $V_2$ has a first sensor sensor $sensor_{21}$ of the sensor type. The third friction wheel 330 has a first position $P_{31}$ and a second position $P_{32}$. The first position $P_{31}$ has a second position sensor $sensor_{32}$ of the sensor type, and the second position $P_{32}$ has a third position sensor sensor$_{33}$ of the sensor type. The third friction wheel 330 to which the third motor motor$_3$ is connected also has a vibration coefficient $V_3$, wherein the vibration coefficient $V_3$ has a first sensor sensor$_{31}$ of the sensor type.

Data correlation should be taken into account in the performance evaluation process of an application by the performance evaluator 130. The change of a single item of data is often not directly significant, but the simultaneous change of multiple data has practical significance. The performance evaluator 130 can decide whether a certain type of data is sufficient to reflect the current problem according to the above classification by the context model classifier 140, and can also determine all the background data of a certain device at a certain time and a certain place.

In sub-step S12, when the result of the data analysis performed by the application on the edge device side 100 does not correspond to the fault reported by the application, the performance evaluator 130 will determine that the performance of the application needs to be upgraded, generate an application upgrade requirement, and send the upgrade requirement to the application updater 220 on the industrial cloud 200.

Specifically, in this embodiment, if the vibration coefficient $V_1$ measured by the first vibration sensor sensor$_{11}$ used to test the first friction wheel 310 exceeds a predetermined threshold, the first application APP$_{11}$ in the first APP container 120 on the edge device side 100 will decide that the first friction wheel 310 is faulty, and the first application APP$_{11}$ will report a fault of the first friction wheel 310. If only the vibration coefficient $V_1$ exceeds the predetermined threshold and the other vibration coefficients V2, V3, and V4 are not abnormal, it is determined that the first friction wheel 310 is indeed faulty. Otherwise, it is determined that the result of the data analysis does not correspond to the fault reported by the first application APP$_{11}$.

Specifically, step S12 further comprises the following steps:

When the result of the data analysis does not correspond to the fault reported by the application, determining that the performance of the application needs to be upgraded, then classifying a plurality of key performance indicators related to the device side, and generating an application upgrade requirement based on the classification, wherein the classification involves a first key performance indicator directly related to the device side and an nth key performance indicator directly related to an nth-layer device connected to the device side, where n is a natural number, and n≥1;

Starting from a first-layer device connected to the device side, querying is performed, based on the classification, layer by layer, for a plurality of key performance indicators corresponding to the device side until at least one relevant key performance indicator corresponding to the fault reported by the application is found, then an application upgrade requirement is generated based on the relevant key performance indicator, and the upgrade requirement is sent to the industrial cloud.

In this embodiment, the automobile production line provided in this embodiment has a large amount of data generated by a large number of sensors, the data analysis algorithm is on the industrial cloud 200, and data analysis requires a large amount of background information about automobile production. The background information comes from the device side and edge device side 100. This embodiment is about cloud health management of industrial field equipment and lifecycle prediction. Among them, equipment health is becoming more and more predictable based on large amounts of data and cloud-based prediction algorithms. At the same time, equipment health is critical to equipment use. For example, unpredictable down time can cause major failures in automatic factories even if it lasts only 1 minute.

Figure 4:
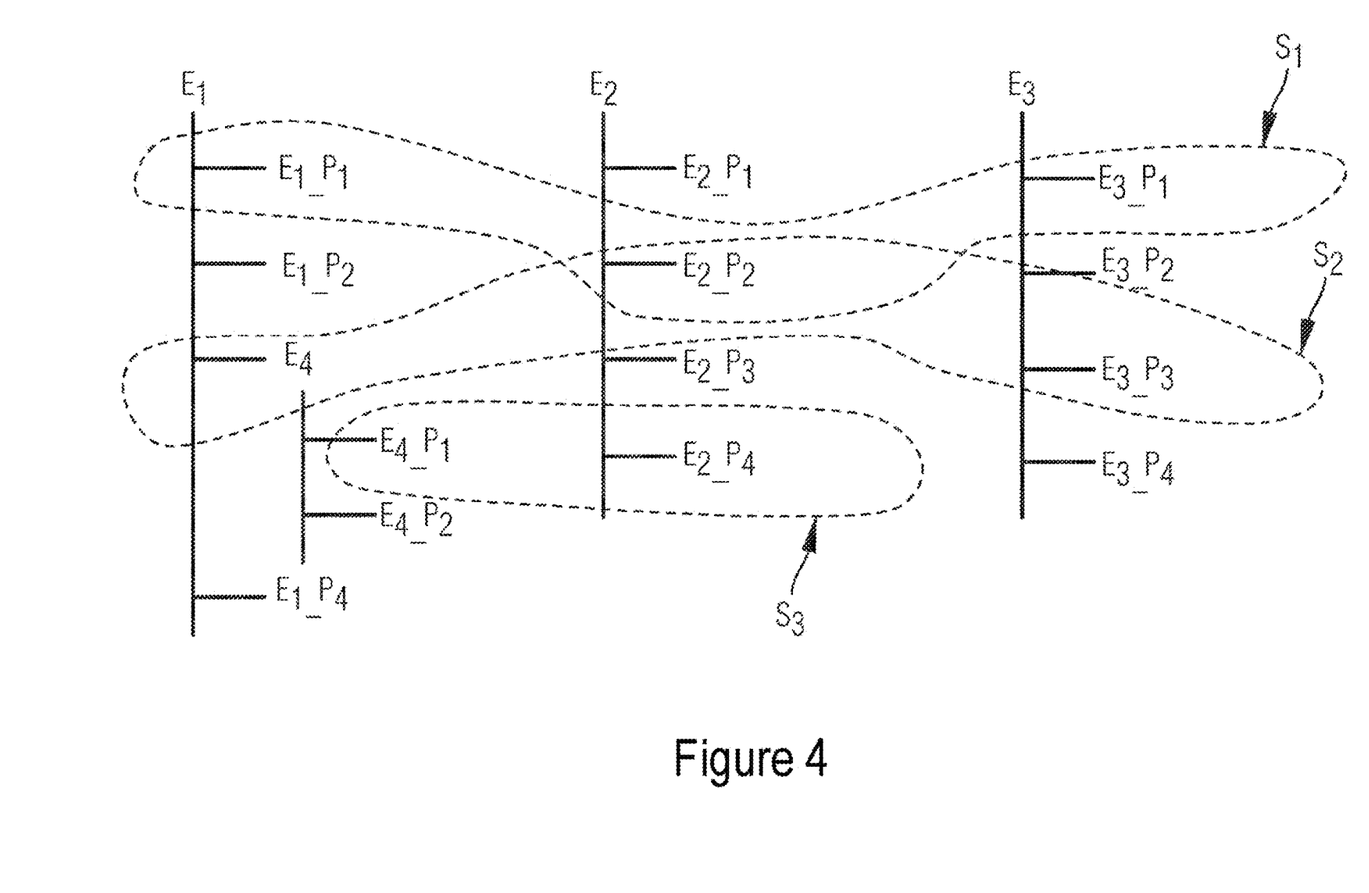
FIG. 4 is a schematic diagram of the context data classification by a context model classifier according to a particular embodiment of the present application.

FIG. 4 is a schematic diagram of the context data classification by the context model classifier 140. Specifically, the semantic model comprises four entities, namely, the first entity $E_1$, the second entity $E_2$, the third entity $E_3$, and the fourth entity $E_4$. Further, the first entity $E_1$ has a first parameter $E_1\_P_1$, a second parameter $E_1\_P_2$ and a fourth parameter $E_1\_P_4$, and is connected to a fourth entity $E_4$, and the fourth entity $E_4$ further has a first parameter $E_4\_P_1$ and a second parameter $E_4\_P_2$. At the same time, the second entity $E_2$ has a first parameter $E_2\_P_1$, a second parameter $E_2\_P_2$, a third parameter $E_2\_P_3$, and a fourth parameter $E_2\_P_4$. The third entity $E_3$ has a first parameter $E_3\_P_1$, a second parameter $E_3\_P_2$, a third parameter $E_3\_P_3$, and a fourth parameter $E_3\_P_4$. As an example, the context model classifier 40 classifies the above-mentioned context parameters by data type, location, and data time. As shown in FIG. 4, the symbol $S_1$ indicates the same data type, $S_2$ indicates the same location, and $S_3$ indicates the same data time.

Specifically, as shown in FIG. 3, the context model classifier 140 classifies the semantic model into three levels according to the relationship among the friction wheels. The first level $F_1$ comprises the first motor motor$_1$ connected to the first friction wheel 310 and its multiple key performance indicators, the second level $F_2$ comprises the second motor motor$_2$ connected to the second friction wheel 320 adjacent to the first friction wheel 310 and its multiple key performance indicators, as well as the third motor motor$_3$ connected to the third friction wheel 330, which is opposite to the first friction wheel 310, and its multiple key performance indicators, and the third level $F_3$ comprises the fourth motor motor$_4$ connected to the fourth friction wheel 340 that is not directly related to the first friction wheel 310 and its multiple key performance indicators.

Therefore, when the data analysis result by the application on the edge device side 100 does not correspond to the fault reported by the application, the performance evaluator 130 firstly starts searching the first level $F_1$ based on the above classification, and queries for the vibration coefficient $V_1$ of the first friction wheel 310, if a first vibration coefficient cannot correspond to the fault reported by the first application APP$_{11}$ for the first friction wheel 310. Hence, the performance evaluator 130 continues the query for the vibration coefficients of the other friction wheels corresponding to the first friction wheel 310 at the second level $F_2$, and then queries at the second level $F_2$ for the vibration coefficient $V_2$ of the second friction wheel 320 adjacent to the first friction wheel 310 and the vibration coefficient $V_3$ of the friction wheel 330 opposite to the first friction wheel 310. If the vibration coefficients $V_1$ and $V_2$ are both abnormal, since the first friction wheel 310 and the second friction wheel 320 are on the same rail, it does not mean that the first friction wheel 310 itself is faulty. Similarly, if the vibration coefficients $V_1$ and $V_3$ are both abnormal and $V_2$ is normal, it does not mean that the first friction wheel 310 itself is faulty, because the first friction wheel 310 and the third friction wheel 330 belong to the same automobile and so it may be the fault of the third friction wheel 330 that causes the vibration of the first friction wheel 310. Of course, the performance evaluator 130 should continue to determine whether it is faulty in itself by iteratively executing the above steps, i.e., also querying for the key performance indicators related to the third friction wheel 330 level by level.

Conversely, if only the vibration coefficient $V_1$ is abnormal and the vibration coefficients $V_2$ and $V_3$ are both normal, the performance evaluator 130 continues to query for the vibration coefficient $V_4$ of the fourth friction wheel 340 which has no direct relationship with the first friction wheel 310 at the third level $F_3$. If the vibration coefficient $V_4$ is also abnormal, it is decided that the fourth friction wheel 340 may be faulty, and the first friction wheel 310 is not faulty. Conversely, if the vibration coefficient $V_4$ is not abnormal, it is decided that the first friction wheel 310 is indeed faulty, the fault reported by the first application $APP_{11}$ is correct, and it is determined that the performance of the first application $APP_{11}$ is normal and there is no upgrade requirement.

Further, step S2 is performed after step S1, wherein the context filter 110 of the edge device side 100 receives a context data requirement generated by the industrial cloud 200 based on the upgrade requirement, then the context filter 110 collects context data from the device side 100 of the production line according to the context data requirement, and returns the context data to the application updater 220 of the industrial cloud 200. In the step, the application updater 220 is used to update the application, and then send it to the edge device side 100 for downloading.

Step S3 is then performed, wherein the first APP container 120 of the edge device side 100 downloads, from the industrial cloud 200, the application updated based on the context data in the second APP container 210. Specifically, in this embodiment, the application updater 220 updates the first application $APP_{11}$, and the first application $APP_{11}$ becomes the first application $APP_{21}$ after being updated; then, the second APP container 210 sends the first application $APP_{21}$ to the first APP container 120 for downloading and replaces the first application $APP_{11}$ in the first APP container 120 with the new first application $APP_{21}$, and in the future, the first application $APP_{21}$ will be used for the data analysis of the friction wheels on the production line. Specifically, the second APP container 210 further contains a first application $APP_{21}$, a second application $APP_{22}$, and a third application $APP_{23}$.

Preferably, the following step is also performed after step 2: the performance evaluator 130 generates a rule based on the fault reported by the application and the relevant key performance indicator, and stores the rule in a database, so as to call the rule from the database to perform data analysis when the application reports a fault again. Specifically, in this embodiment, the performance evaluator 130 generates the following rule based on the first application $APP_{11}$:

When the vibration coefficient $V_1$ exceeds the predetermined threshold and the vibration coefficients $V_2$, $V_3$ and $V_4$ are normal, it is determined that the first friction wheel 310 is faulty.

When the vibration coefficients $V_1$ and $V_2$ both exceed the predetermined threshold and the vibration coefficients $V_3$ and $V_4$ are normal, it is determined that the first friction wheel 310 is not faulty.

When the vibration coefficients $V_1$ and $V_3$ both exceed the predetermined threshold and the vibration coefficients $V_2$ and $V_4$ are normal, it is determined that the first friction wheel 310 is not faulty.

When the vibration coefficient $V_1$ and $V_4$ both exceed the predetermined threshold and the vibration coefficients $V_2$ and $V_3$ are normal, it is determined that the first friction wheel 310 is not faulty.

When the vibration coefficients $V_1$, $V_2$ and $V_3$ all exceed the predetermined threshold and the vibration coefficient $V_4$ is normal, it is determined that the first friction wheel 310 is not faulty.

When the vibration coefficients $V_1$, $V_2$ and $V_4$ all exceed the predetermined threshold and the vibration coefficient $V_3$ is normal, it is determined that the first friction wheel 310 is not faulty.

When the vibration coefficients $V_1$, $V_2$, $V_3$ and $V_4$ all exceed the predetermined threshold, it is determined that the first friction wheel 310 is not faulty.

In other words, a single item of data does not necessarily indicate a fault in the device, but the background data related to this data can be used to make a correct decision about faults, so as to evaluate the performance of the application in data analysis and to adjust the parameters of the application and update it.

In the second embodiment, the present application also provides a data analysis method implemented on an industrial cloud, which mainly works in conjunction with the data analysis method implemented on an edge device side provided in the first embodiment of the present application and comprises the following steps:

Firstly, step A1 is performed, wherein the application updater 220 receives an application upgrade requirement generated by the performance evaluator 130 of the edge device side based on a performance evaluation result obtained after the performance evaluation on the application based on a key performance indicator;

Then, step A2 is performed, wherein the application updater 220 generates a context data requirement based on the upgrade requirement, and sends the context data requirement to the context filter 110 of the edge device side. Further, the context filter 110 instructs the edge device 200 to collect data from the device side so as to update the relevant application. For example, in this embodiment, when it is insufficient to use only the vibration coefficient V1 to decide whether the friction wheel 310 itself is faulty, a context data requirement can be sent to instruct the edge device to collect the vibration coefficient V2 of the second friction wheel 320, the vibration coefficient V3 of the second friction wheel 330, or the vibration coefficient V4 of the second friction wheel 340.

Finally, step A3 is performed, wherein the application updater 220 receives the context data collected by the edge device from a device side according to the context data requirement, and updates the application based on the context data; and the second APP container 210 provides the updated application to the edge device side for downloading.

Further, the context comprises a relationship between a device and a related device and a parameter of the device.

Optionally, the data analysis method implemented on an edge device side further comprises the following step after step A2:

Generating a rule based on the fault reported by the application and the relevant key performance indicator, and storing the rule in a database so as to call the rule from the database to perform data analysis when the application reports a fault again.

That is, the above step may be performed on the edge device side 200, or on the industrial cloud 100.

The data analysis mechanism provided by the present application simplifies the development process of customized and specific applications, which upgrade automatically to adapt to field operation condition changes.

The present application involves the industrial cloud and the field. The field involves a device side and an edge device side. Among them, large and complex devices for generating applications are implemented on the industrial cloud, while small and simple applications are executed on the edge device side, which makes full use of the computing power of both computing platforms. The present application can easily integrate the domain conditions into the model by use of a scenario establishment module, and ensures that all data analysis algorithms are designed taking account of the real production environment.

Although the present has been described in detail through the above preferred embodiments, it should be recognized that the above description should not be construed as limiting the present invention. After those skilled in the art read the above, various modifications and alternatives to the present invention will become obvious. Therefore, the scope of the present invention is only limited by the appended claims. In addition, any reference symbols in the claims may not be construed as limiting the relevant claims; the term "comprising" does not exclude other devices or steps not listed in other claims or the description; terms such as "first" and "second" are only used to indicate names, and do not indicate any specific order.

The invention claimed is:

1. A data analysis method implemented on an edge device side, the edge device side being connected to at least one device side, the method comprising:
   performing, by an application on the edge device side, a data analysis for the at least one device side by collecting at least one key performance indicator of the at least one device side, evaluating performance of the application according to a result of the data analysis performed, generating an application upgrade requirement based on a result of the performance evaluating, and sending the application upgrade requirement to an industrial cloud;
   receiving a context data requirement generated by the industrial cloud based on the application upgrade requirement, collecting context data from the at least one device side according to the context data requirement, and returning the context data to the industrial cloud; and
   downloading, from the industrial cloud, the application updated by the industrial cloud based on the context data.

2. The data analysis method of claim 1, wherein the performing further comprises:
   performing, by the application on the edge device side, a data analysis for the at least one device side by collecting at least one key performance indicator of the at least one device side, generating a semantic model of the at least one device side in consideration of the context, and determining, based on the semantic model, whether the result of the data analysis corresponds to a fault reported by the application; and
   determining, upon the result of the data analysis does not correspond to the fault reported by the application, determining that the performance of the application needs to be upgraded, generating an application upgrade requirement, and sending the application upgrade requirement to the industrial cloud.

3. The data analysis method of claim 2, wherein the context comprises a relationship between a device and a related device, and parameters of the device and the related device.

4. The data analysis method of claim 2, wherein the determining further comprises:
   determining, upon the result of the data analysis not corresponding to the fault reported by the application, that the performance of the application needs to be upgraded; classifying a plurality of key performance indicators related to the at least one device side; and generating an application upgrade requirement based on the classification, the classification involving a first key performance indicator directly related to the at least one device side and an nth key performance indicator directly related to an nth-layer device connected to the at least one device side, wherein n is a natural number, and n≥1; and
   starting from a first-layer device connected to the at least one device side; performing a query, based on the classification, layer by layer, for a plurality of key performance indicators corresponding to the at least one device side until at least one relevant key performance indicator corresponding to the fault reported by the application is found; generating an application upgrade requirement based on the relevant key performance indicator; and sending the application upgrade requirement to the industrial cloud.

5. The data analysis method of claim 4, further comprising, after the receiving:
   generating a rule based on the fault reported by the application and the relevant key performance indicator, and
   storing the rule in a database so as to call the rule from the database to perform data analysis when the application reports a fault again.

6. A data analysis method implemented on an industrial cloud, comprising:
   receiving an application upgrade requirement generated based on a performance evaluation result obtained after an edge device side performs a performance evaluation of an application based on a key performance indicator;
   generating a context data requirement based on the application upgrade requirement, and sending the context data requirement to the edge device side; and
   receiving context data collected by the edge device from a device side according to the context data requirement, and updating the application based on the context data, so that the updated application is provided to the edge device side to allow the edge device side to download the updated application.

7. The data analysis method of claim 6, wherein the context comprises a relationship between a device and a related device, and parameters of the device and the related device.

8. The data analysis method of claim 6, further comprising, after the generating:
   generating a rule based on a fault reported by the application and a relevant key performance indicator, and storing the rule in a database so as to call the rule from the database to perform a data analysis when the application reports a fault again.

9. A data analysis system implemented on an industrial cloud, comprising:
   a processor; and
   a memory coupled to the processor, the memory storing an instruction which, when executed by the processor, enables an electronic device to perform actions, the actions comprising:
   performing, by an application on an edge device side, a data analysis for at least one device side by collecting at least one key performance indicator of the at least one device side, evaluating performance of the application according to a result of the data analysis, generating an application upgrade requirement based on the performance evaluation result, and sending the application upgrade requirement to an industrial cloud;

receiving a context data requirement generated by the industrial cloud based on the application upgrade requirement, collecting context data from the at least one device side according to the context data requirement, and returning the context data to the industrial cloud; and downloading, from the industrial cloud, the application updated by the industrial cloud based on the context data.

10. The data analysis system of claim 9, wherein the performing further comprises:

performing, by the application on the edge device side, a data analysis for the device side by collecting at least one key performance indicator of the at least one device side, generating a semantic model of the device side in consideration of the context, and determining, based on the semantic model, whether a result of the data analysis corresponds to a fault reported by the application; and determining, upon the result of the data analysis not corresponding to the fault reported by the application, that the performance of the application needs to be upgraded, generating an application upgrade requirement, and sending the application upgrade requirement to the industrial cloud.

11. The data analysis system of claim 9, wherein the context comprises a relationship between a device and a related device, and parameters of the device and the related device.

12. The data analysis system of claim 10, wherein the determining further comprises:

determining, upon the result of the data analysis does not correspond to the fault reported by the application, that performance of the application needs to be upgraded, classifying a plurality of key performance indicators related to the device side, and generating an application upgrade requirement based on the classification, wherein the classification involves a first key performance indicator directly related to the at least one device side and an nth key performance indicator directly related to an nth-layer device connected to the device side, where n is a natural number, and n≥1; and starting from a first-layer device connected to the at least one device side, performing a query, layer by layer and based on the classification, for a plurality of key performance indicators corresponding to the at least one device side until at least one relevant key performance indicator corresponding to the fault reported by the application is found, generating an application upgrade requirement based on the relevant key performance indicator, and sending the application upgrade requirement to the industrial cloud.

13. The data analysis system of claim 12, wherein the data analysis method implemented on an edge device side further comprises, following the receiving: generating a rule based on the fault reported by the application and the relevant key performance indicator, and storing the rule in a database, the rule being callable from the database to perform data analysis when the application reports a fault again.

14. A data analysis system implemented on an industrial cloud, comprising:

a processor; and a memory coupled to the processor, the memory storing an instruction which, when executed by the processor, enables an electronic device to perform actions, the actions comprising:

receiving an application upgrade requirement generated based on a performance evaluation result obtained by an edge device side after performing a performance evaluation of an application based on a key performance indicator;

generating a context data requirement based on the application upgrade requirement, and sending the context data requirement to the edge device side; and receiving context data collected by the edge device side from a device side according to the context data requirement and updating the application based on the context data so that the updated application is provided to the edge device side to allow the edge device side to download the updated application.

15. The data analysis system of claim 14, wherein the context comprises a relationship between a device and a related device, and parameters of the device and the related device.

16. The data analysis system of claim 14, further comprising, after the generating:

generating a rule based on the fault reported by the application and the relevant key performance indicator, and storing the rule in a database, the rule being callable from the database to perform data analysis when the application reports a fault again.

* * * * *